(12) United States Patent
Wong

(10) Patent No.: US 8,298,318 B2
(45) Date of Patent: Oct. 30, 2012

(54) INTEGRATED SPIN SYSTEMS FOR THE SEPARATION AND RECOVERY OF ISOTOPES

(76) Inventor: Alfred Y. Wong, Los Angeles, CA (US)

( * ) Notice: Subject to any disclaimer, the term of this patent is extended or adjusted under 35 U.S.C. 154(b) by 8 days.

(21) Appl. No.: 12/783,550

(22) Filed: May 19, 2010

(65) Prior Publication Data

US 2010/0294666 A1  Nov. 25, 2010

Related U.S. Application Data

(60) Provisional application No. 61/179,625, filed on May 19, 2009.

(51) Int. Cl.
*B03C 1/023* (2006.01)
(52) U.S. Cl. .......................... 95/28; 96/1; 96/3
(58) Field of Classification Search .............. 95/28, 78; 96/1–3, 61; 210/222, 223, 243, 748.01, 695
See application file for complete search history.

(56) References Cited

U.S. PATENT DOCUMENTS

| | | | | |
|---|---|---|---|---|
| 4,046,527 A | * | 9/1977 | Kistemaker | 96/3 |
| 4,090,855 A | * | 5/1978 | Hora et al. | 96/3 |
| 5,968,231 A | * | 10/1999 | Parmentier et al. | 95/28 |
| 6,096,220 A | * | 8/2000 | Ohkawa | 210/695 |
| 6,214,223 B1 | * | 4/2001 | Ohkawa | 210/222 |
| 6,217,776 B1 | * | 4/2001 | Ohkawa | 210/695 |
| 6,248,240 B1 | * | 6/2001 | Ohkawa | 210/695 |
| 6,251,281 B1 | * | 6/2001 | Ohkawa | 210/695 |
| 6,251,282 B1 | * | 6/2001 | Putvinski et al. | 210/695 |
| 6,322,706 B1 | * | 11/2001 | Ohkawa | 210/695 |
| 6,515,281 B1 | * | 2/2003 | Ohkawa | 250/291 |
| 6,726,844 B2 | * | 4/2004 | Ohkawa et al. | 210/695 |
| 6,730,231 B2 | * | 5/2004 | Putvinski | 210/695 |
| 6,787,044 B1 | * | 9/2004 | Freeman et al. | 210/695 |
| 2005/0173630 A1 | * | 8/2005 | Ohkawa | 250/296 |

FOREIGN PATENT DOCUMENTS

JP  56-40424 A  *  4/1981  ........................ 95/28

* cited by examiner

*Primary Examiner* — Richard L Chiesa
(74) *Attorney, Agent, or Firm* — Novak Druce DeLuca + Quigg LLP

(57) ABSTRACT

Embodiments of the present disclosure relate to a system and methods for the recovery of isotopes. In at least one exemplary method of the present disclosure at least one gas comprising a plurality of isotopes is provided. An electric field is generated in a radial direction to at least partially ionize the gas. A magnetic field is generated in an axial direction perpendicular to the radial direction and at least one isotope is recovered from the gas.

12 Claims, 2 Drawing Sheets

INTEGRATED SPIN SYSTEMS FOR THE SEPARATION AND RECOVERY OF ISOTOPES

CROSS-REFERENCE TO RELATED APPLICATIONS

The present application claims priority under 35 U.S.C. §119(e) from U.S. Provisional Application No. 61/179,625 filed May 19, 2009, which is incorporated by reference in its entirety, for all purposes, herein.

FIELD

This disclosure generally relates to systems and methods for the separation of isotopes. More specifically, the present disclosure is directed to systems and methods for the separation and recovery of isotopes with the use of plasma.

BACKGROUND

The use of stable isotopes is applicable to a broad range of scientific research and is strategically important to industries in the United States. Separated stable isotopes are widely used in medical and other industrial applications. In the medical industry they can be used as radioactive precursors for imaging, diagnostics and therapeutics in PET scanning and cancer treatment applications. Separated isotopes can also be used as specialized materials in nuclear power plants (non-fuel), nuclear batteries, semiconductors, electronics and non-destructive testing equipment.

The supply of enriched stable isotopes is inadequate to accommodate the rapidly growing demand in the United States. Current domestic demand is being satisfied through existing inventory, for example from Oak Ridge National Laboratory (ORNL) and production from foreign sources in Russia and China. At present, Russia is the only major supplier of enriched isotopes with China as the only other major competitor. Therefore, the stability of future supply is a concern for various domestic industrial development and government defense strategies. A stable domestic supply of enriched isotopes can insulate the United States from geopolitical influences arising from the reliance on foreign supply.

The quality of the isotopes produced in an environment absent of third-party quality verification (such as ISO 9001) and the proximity of foreign suppliers to domestic research clients is also a growing concern. Current production of isotopes in the United States is further exacerbated due to the lack of domestic electromagnetic separators and gas centrifuges which are used to produce over half of the global isotope supply. This is compounded by the fact that current centrifuge technology is archaic, slow, costly and susceptible to mechanical failure at high rates of rotation. There are few domestic efforts to develop next generation isotope production technologies and newer experimental technologies only provide incremental improvements that do not out weight the cost of development.

Therefore, there is a need in the field of art for improved systems and methods for the separation and production of enriched stable isotopes.

SUMMARY

Embodiments of the present disclosure relate to a system and methods for the recovery of isotopes. In at least one exemplary method of the present disclosure at least one gas comprising a plurality of isotopes is provided. An electric field is generated in a radial direction to at least partially ionize the gas. A magnetic field is generated in an axial direction perpendicular to the radial direction and at least one isotope is recovered from the gas.

The foregoing and other objects, features and advantages of the present disclosure will become more readily apparent from the following detailed description of exemplary embodiments as disclosed herein.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

DETAILED DESCRIPTION

Figure 1:
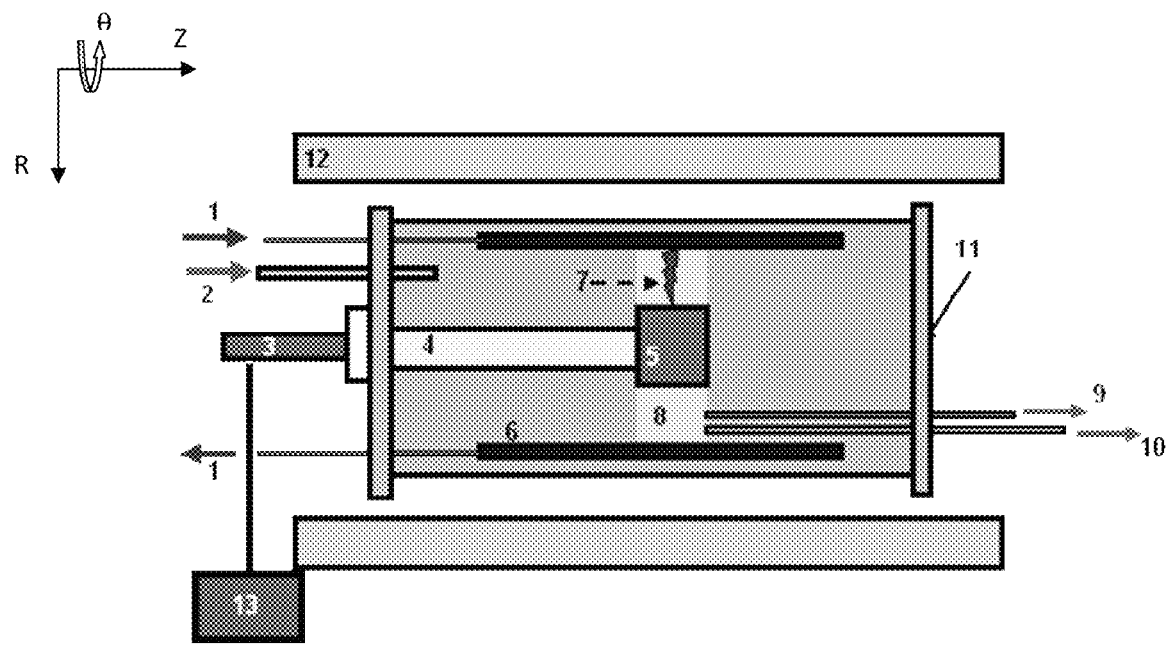
FIG. 1 illustrates an exemplary system for the separation and recovery of isotopes according to one embodiment.

The disclosure relates to a systems and methods for the separation and recovery of isotopes. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, methods, procedures and components have not been described in detail so as not to obscure the embodiments described herein.

FIG. 1 illustrates an exemplary system for the separation and recovery of isotopes according to one embodiment. The system can include a cooling water input 1, a gas input 2, a central discharge rod 3, central discharge rod insulation 4, an expanded discharge rod 5, external discharge shell 6, gaseous product outputs 9, 10, a vacuum chamber 11, a superconducting magnet 12 and a discharge power supply 13. A background gas and a target gas can be flowed through the target gas input 2 and into the vacuum chamber 11.

The background gas composition can include any material that can be ionized or converted to plasma in the presence of a power source including, but not limited to air, helium, argon, molybdenum, germanium, nitrogen, oxygen, hydrogen, xenon, gold, calcium, copper and or any other gaseous composition formed from an element in the periodic table that can be ionized or converted to plasma.

The target gas composition includes isotopes of one or more gaseous elements including but not limited to isotopes of germanium, molybdenum, nitrogen, calcium, oxygen, hydrogen, xenon, gold, copper or any other element in the periodic table having naturally occurring or man-made isotopes. The target gas can be created from a solid metal element having naturally occurring or man-made isotopes, including but not limited to metals comprising germanium, molybdenum, calcium, copper, gold isotopes or any other solid metal isotopes formed from an element in the periodic table. The solid metal element from which the target gas is created can be vaporized into a gaseous state with the use of an oven that can be electrically heated. The solid metal element from which the target gas is created can also be vaporized into a gaseous state by contacting the metal with a laser. The laser can be, but is not limited to an nd-Yag laser, a $CO_2$ laser or any other laser capable of vaporizing a metal element having isotopes.

As previously described, the background gas and the target gas can be flowed through the gas input 2 and into the vacuum chamber 11. The background gas and the target gas can also be the same gas, thereby reducing the number of constituents that are introduced into the system. The discharge power supply 13 supplies power or voltage through a central discharging rod 3 insulated with central discharge rod insulation 4 and to the expanded discharge rod 5 within the vacuum gas chamber 11. The expanded discharge rod 5 acts as an electrode to which a high voltage pulse can be applied with the discharge power supply 13. The electric field and the difference in voltage potential between the external discharge shell 6 and the expanded discharge rod 5 drives a plasma discharge current 7 in the radial direction R between the external discharge shell 6 and the expanded discharge rod 5. The electric field and plasma discharge current 7 is generated in the radial direction R. The plasma discharge current 7 flows through the background gas to ionize the gas and create a plasma. The plasma discharge current 7 at least partially ionizes the background gas occupying the annular space between the external discharge shell 6 and the expanded discharge rod 5.

A superconducting magnet 12 can be used to generate a magnetic field in the axial direction Z perpendicular to the radial direction and the electric field generated by the discharge power supply 13. The presence of an electric field or current in a radial plane perpendicular to the magnetic field generated in an axial plane produces a rotational force in the θ direction. In this way, the system makes use of the Lorentz Force represented by the following formula: F=J×B, wherein F is the Lorentz Force of the rotational force, J is the current density and B is the magnitude of the magnetic field. The rotational force created by the proximity and position of the electric field relative to the magnetic field induces the rotation of the ionized background gas and the neutral target gas 8 including isotopes. The rotation of the neutral target gas and isotopes therein facilitates the separation of lighter isotopes in the neutral target gas from heavier isotopes in the neutral target gas similar to a centrifuge.

A strong ion-neutral coupling effect occurs between the ionized background gas and the neutral target gas containing isotopes. This ion-neutral coupling effect creates a coupling bond between the ionized background gas and the neutral target gas. As rotation is induced, the ionized background gas couples to and drives the rotation of the neutral target gas. One ion of background gas can drive 10,000 4 neutrals of neutral target gas atoms in a medium wherein the mean free path is the smallest characteristic length. A large neutral density not only contributes to a high throughput but also helps maintain a low overall temperature of the process. Cooling water can also be flowed through the cooling water input 1 to maintain a low overall temperature of the system or surrounding vacuum gas chamber 11.

Figure 2:
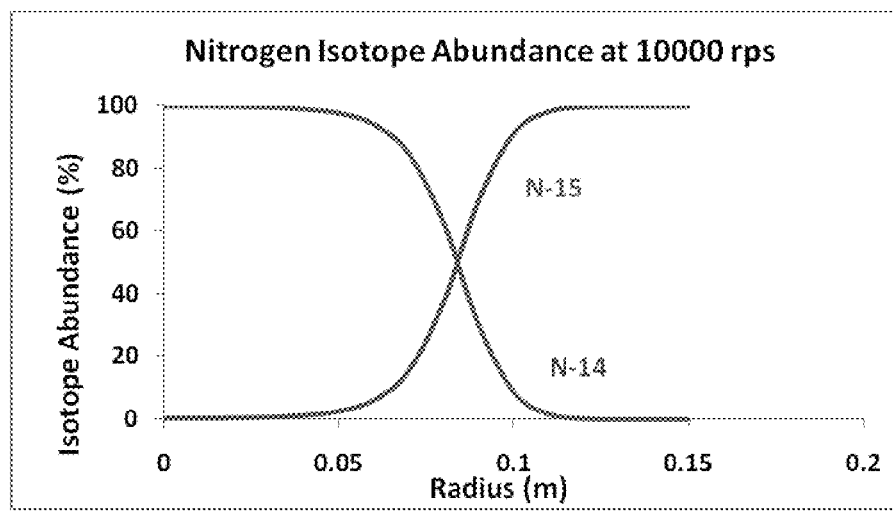
FIG. 2 illustrates Nitrogen isotope abundance as a function of radial direction R.

A gaseous product containing lighter enriched isotopes rotates at a smaller distance in the radial direction relative to a gaseous product containing heavier enriched isotopes. In this way, lighter isotopes can be separated from heavier isotopes by providing gaseous product outputs 9, 10 at different distances in the radial direction R within the system. This phenomenon is illustrated in FIG. 2 wherein nitrogen isotopes were rotated at 10,000 rotations per second using the systems and methods herein disclosed. As shown in FIG. 2, the heavier N-15 isotopes were present at larger radial distances than lighter N-14 isotopes. The isotopes within the target gas can be recovered by cooling the separated gaseous product outputs within a chamber, on a rotating disc or any other surface to condense the gas into a solid isotope.

Using the system illustrated in FIG. 1, extremely high rotation velocities can be achieved that directly contribute to an extremely high separation efficiency of isotopes, as shown in the following equation:

$$q(r) + 1 = \exp\left(\frac{\omega^2 r^2 \Delta m}{2kT}\right)$$

wherein r is the separation factor, ω is the rotation rate, r is the radius, Δm is the species mass difference, k is the Boltzmann constant and T is the temperature. The equation shows that the separation efficiency depends exponentially on the square of the rotation velocity.

Figure 3:
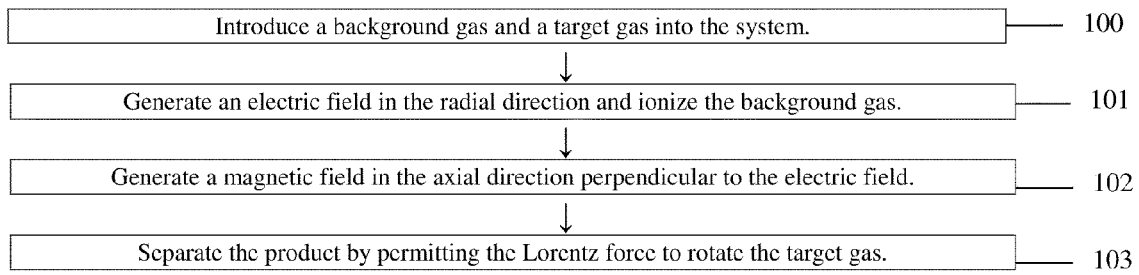
FIG. 3 illustrates a flow chart of an exemplary method for the separation and recovery of isotopes according to one embodiment.

FIG. 3 illustrates a flow chart of an exemplary method for the separation and recovery of isotopes according to one embodiment. In step 100, a background gas and a target gas are introduced into a system for the separation and recovery of isotopes such as the system disclosed in reference to FIG. 1. The system can include a cooling water input, a gas input, a central discharge rod, central discharge rod insulation, an expanded discharge rod, external discharge shell, gaseous product outputs, a vacuum chamber, a superconducting magnet and a discharge power supply. The background gas and the target gas can also be the same gas, thereby reducing the number of constituents that are introduced into the system. In step 101, an electric field is generated in the radial direction and the background gas and/or target gas (if the background gas and target gas are the same) is ionized or converted to a plasma by providing a high voltage pulse from a discharge power supply that contacts the gas. An electric field and a difference in voltage potential is created with the discharge power supply that drives a plasma discharge current in the radial direction R. The plasma discharge current flows through the gas to ionize the gas and create a plasma. The plasma discharge current at least partially ionizes the background gas within the system.

In step 102, a superconducting magnet can be used to generate a magnetic field in the axial direction perpendicular to the radial direction and the electric field generated by the discharge power supply. The presence of an electric field or current in a radial plane perpendicular to the magnetic field generated in an axial plane produces a rotational force. The rotational force created by the proximity and position of the electric field relative to the magnetic field induces the rotation of the ionized background gas and the neutral target gas including isotopes. In step 103, the isotopes within the rotating target gas are permitted to separate due to the created Lorentz Force, caused by providing an electric field in a plane perpendicular to a magnetic field, and ion-neutral coupling that occurs from ionizing the background gas (and/or target gas). The rotation of the neutral target gas and isotopes therein facilitates the separation of lighter isotopes in the neutral target gas from heavier isotopes in the neutral target gas similar to a centrifuge.

A strong ion-neutral coupling effect occurs between the ionized background gas and the neutral target gas containing isotopes. This ion-neutral coupling effect creates a coupling bond between the ionized background gas and the neutral target gas. As rotation is induced the ionized background gas couples to and drives the rotation of the neutral target gas. A large neutral density not only contributes to a high throughput but also helps maintain a low overall temperature of the process. Cooling water can also be flowed through the cooling water input to maintain a low overall temperature of the process.

A gaseous product containing lighter enriched isotopes rotates at a smaller distance in the radial direction relative to a gaseous product containing heavier enriched isotopes. In this way, lighter isotopes can be separated from heavier isotopes by providing gaseous product outputs at different distances in the radial direction within the system. The light to heavy isotopes in the target gas product can be continually flowed out of the system, recovered and cooled to condense the isotopes into a solid product.

The systems and methods herein disclosed can be used to separate any solid, liquid or gaseous material having different weights. The systems and methods herein can also be used to separate out useful products from radioactive constituents contained in radioactive waste.

The system and methods disclosed herein are simple, compact and capable of separating large quantities (~1 ton) of gaseous and solid isotopes efficiently and economically. The systems and methods disclosed herein makes use of Lorentz force and "strong ion-neutral coupling" effect in very weakly ionized plasmas to drive high density neutral particles to rotate at high speed (up to 17,000 revolutions per second. No mechanical rotor or other mechanical means is used to effect the separation and recovery of isotopes. The systems and methods disclosed herein have several advantages over conventional gaseous centrifuges. The rotor wall speed of the conventional centrifuge is limited by the tensile strength of the rotor material. The best carbon fiber rotor cannot exceed 600 m/sec whereas particles in systems and methods disclosed herein have been observed to achieve rotational speeds up to 15,000 m/sec. There is indeed no theoretical speed limit imposed by the mechanical strength of materials used in the systems herein disclosed. The lifetime of the systems are also expected to be much longer since no bearings are needed. Secondly, the throughput of each traditional gaseous centrifuge is very small due to size limitation and thousands of units in multi-cascade stages are needed to produce the quantity and enrichment of isotopes required in large productions as required by the neutrino experiments. By contrast, a single unit of the systems herein disclosed can achieve the same quantity and level of enrichment because of higher rotational speeds that are achieved. The energy consumption of the systems and methods herein disclosed are much lower since only weakly ionized plasma is needed. The systems and methods herein disclosed are characterized by compactness, high efficiency, high throughput and low energy consumption.

All of the systems, methods and compositions disclosed and claimed herein can be made and executed without undue experimentation in light of the present disclosure. While systems, methods and compositions have been described in terms of preferred embodiments, it will be apparent to those of skill in the art that variations may be applied to the systems, methods and compositions and in the steps or in the sequence of steps of the methods described herein without departing from the concept, spirit and scope of the invention. The subject matter that is intended to be within the spirit of this disclosure is set forth in the following claims.

What is claimed is:

1. A method for recovering isotopes comprising:
providing at least one neutral target gas comprising at least a plurality of isotopes into a chamber;
providing at least one ionizable background gas into said chamber;
generating an electric field in a first direction of said chamber;
generating a plasma discharge current in said chamber to at least partially ionize the background gas;
generating a magnetic field in a second direction of said chamber perpendicular to the first direction to induce rotation of said ionized gas about an axis of said chamber and to induce ion-neutral coupling between the ionized background gas and the neutral target gas; and
recovering at least one isotope of said neutral target gas from said rotating ionized gas.

2. The method as recited in claim 1, wherein recovering said at least one isotope comprises cooling the ionized gas.

3. The method as recited in claim 1, wherein recovering said at least one isotope comprises extracting said isotope from said ionized gas at a first predetermined radial distance from said axis.

4. The method as recited in claim 3, further comprising recovering at least a second isotope by extracting said second isotope from said ionized gas at a second predetermined radial distance from said axis that is different from said first radial distance.

5. The method as recited in claim 1, wherein said first direction is a radial direction of said chamber.

6. The method as recited in claim 5, wherein said second direction is an axial direction of said chamber.

7. Apparatus for recovering isotopes, comprising:
a chamber having a gas input line and a product output line;
a discharge rod;
a discharge shell surrounding said discharge rod;
a voltage supply for establishing a voltage difference between said discharge rod and said discharge shell, and for generating a plasma discharge current that at least partially ionizes a background gas introduced into said chamber through said gas input line; and
a magnet for generating a magnetic field in said chamber in a direction perpendicular to said voltage difference, said magnetic field causing said ionized background gas to rotate within said chamber in a direction about an axis of said chamber and to couple with neutrals of a neutral target gas comprising at least a plurality of isotopes so as to separate at least one isotope of said neutral target gas within a localized area of said rotating ionized gas;
wherein at least one isotope is extracted from said chamber through said product output line inserted into said localized area of said rotating ionized gas.

8. Apparatus as set forth in claim 7, further comprising a cooling mechanism for condensing said at least one isotope into a solid product.

9. Apparatus for recovering isotopes, comprising:
a chamber;
a voltage supply for establishing a voltage difference within said chamber, wherein said voltage difference at least partially ionizes a background gas introduced into said chamber; and
a magnet for generating a magnetic field in said chamber in a direction perpendicular to said voltage difference, said magnetic field causing said ionized background gas to rotate within said chamber in a direction about an axis of said chamber and to couple with neutrals of a neutral target gas comprising at least a plurality of isotopes so as to separate at least one isotope of said neutral target gas within a localized area of said rotating ionized gas;
wherein at least one isotope is extracted from said chamber from said rotating ionized gas.

10. Apparatus as set forth in claim 9, further comprising:
a discharge rod; and
a discharge shell surrounding said discharge rod;
wherein said voltage supply establishes a voltage difference between said discharge rod and said discharge shell.

11. Apparatus as set forth in claim 10, wherein said chamber is a vacuum chamber.

12. Apparatus as set forth in claim 9, further comprising a cooling mechanism for condensing said at least one isotope into a solid product.

* * * * *

UNITED STATES PATENT AND TRADEMARK OFFICE
CERTIFICATE OF CORRECTION

| | | Page 1 of 1 |
|---|---|---|
| PATENT NO. | : 8,298,318 B2 | |
| APPLICATION NO. | : 12/783550 | |
| DATED | : October 30, 2012 | |
| INVENTOR(S) | : Alfred Y. Wong | |

It is certified that error appears in the above-identified patent and that said Letters Patent is hereby corrected as shown below:

In the Specification

Column 1, line 12 above "FIELD" the following paragraph is inserted:

--STATEMENT REGARDING FEDERALLY SPONSORED RESEARCH OR DEVELOPMENT

This invention was made with Government support under Award DE-DE-FG02-08ER84985 awarded by the Department of Energy. The Government has certain rights in this invention.--.

Signed and Sealed this
Twenty-first Day of October, 2014

Michelle K. Lee
*Deputy Director of the United States Patent and Trademark Office*